July 26, 1949.  H. CAVI  2,477,238

STERILIZER FOR RECEPTACLES

Filed March 28, 1945

HARRY CAVI
INVENTOR.

BY Edward J. Kruglak
ATTORNEY

Patented July 26, 1949

2,477,238

UNITED STATES PATENT OFFICE 2,477,238

STERILIZER FOR RECEPTACLES

Harry Cavi, New York, N. Y.

Application March 28, 1945, Serial No. 585,287

4 Claims. (Cl. 21—94)

This invention relates to new and useful improvements in sterilizers, dishwashing machines, sinks, plumbing fixtures, pipe lines and the like, especially where wash-water is recirculated, or where salt water or chemical fluids, etc., are used.

The recirculated wash-water frequently contains grease and particles deposited from the utensils. This clogs the spray pipes necessitating frequent shut-downs for cleaning, with resultant high maintenance cost. The same difficulty is encountered on shipboard and elsewhere where salt water is used due to salt incrustation.

An object of this invention is to provide a simple means for flushing the spray pipes and removing all foreign matter and incrustations at the end of each washing operation.

A further object of this invention is to eliminate during the washing and sterilizing operation, the necessity of manually handling utensils which may contain harmful or obnoxious matter.

These and other objects will be apparent from the description to follow and reference to the drawing.

One form of the invention is shown embodied in a sterilizer for utensils. However, the invention is not limited to any particular physical embodiment, but on the contrary is susceptible of being expressed in different structures and forms and certain of its features may be employed to the exclusion of others in view of the appended claims.

In the drawing forming part of this specification:

Figure 1:
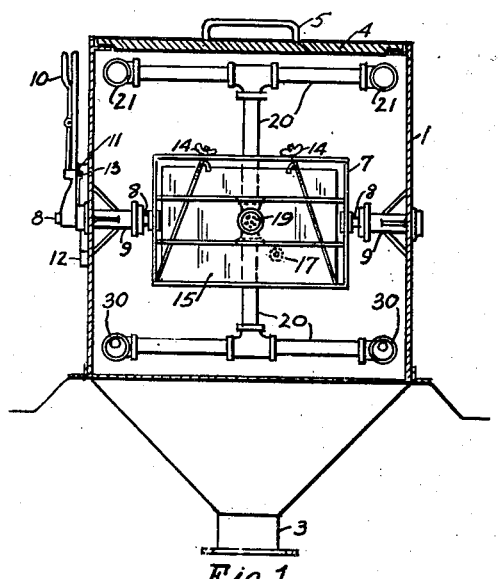
Figure 1 is a front sectional elevation.
Figure 2:
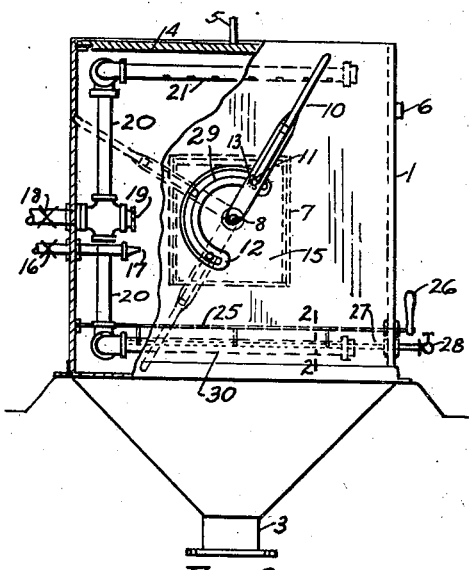
Figure 2 is a side sectional elevation.
Figure 3:
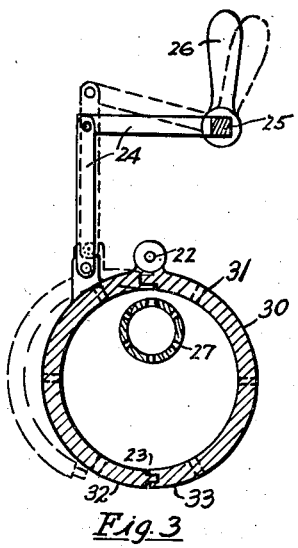
Figure 3 is a section taken along line 2—2 of Fig. 2.

Referring to the drawing, the sterilizer includes casing 1, terminating at its bottom in drain outlet 3, a tight fitting removable cover 4, provided with a suitable handle 5, and steam exhaust outlet 6. Receptacle holder 7 is disposed within said casing, and has locking clamps 14 for holding utensils or receptacles in said holder. Said holder is rotatably supported by shafts 8 which extend through aligned thrust bearings 9 in the sides of the casing. Handle 10 has a lug 11 adapted to move in groove 29 of arcuate-shaped guide 12 and lockingly engage with spaces recesses 13. Steam inlet 16 terminates in nozzle 17. Water supply inlet 18 connects through piping 20 to spray pipes 21 and 30. Said spray pipes 30 include split segments 32 and 33 having perforations 31, pivoted at 22 and lockingly engaging at 23. Segment 32 is connected to handle 26 through linkage 24 and rod 25. A perforated spray pipe 27 disposed within spray pipes 30, and is connected to water supply inlet 28.

In operation, receptacle 15 is placed in holder 7, and held in place by locking clamps 14; cover 4 is closed and water supply inlet 18 is opened. Spray pipes 21 loosen the solid matter in the receptacle. Handle 10 is then moved to the middle position of arcuate-shaped guide 12 causing lug 12 to move in and along groove 29 until it lockingly engages with recess 13, thereby causing the receptacle to assume and retain a lateral position facing spray nozzle 19 which further loosens and flushes out solid matter in the receptacle. Said handle is then moved to the furthermost position causing the receptacle to assume and retain an upright position with its open end facing downward, permitting spray pipe 30 to flush out all remaining matter. The water supply is then turn off. Handle 10 is then moved to the middle position causing said receptacle to assume and retain a lateral position with its open end facing steam nozzle 17. Steam inlet 16 is opened to admit live steam to sterilize and dry the receptacle. The receptacle is unclamped and removed in a dry, clean and sanitary condition. Water inlet 28 is turned on permitting water to spray through perforated pipes 27, handle 26 is moved to operate linnkage 24 which open a segment of spray pipe 21 flushing out all deletereous matter in said spray pipe. The water supply is turned off, the segment closed, and the operation completed.

Having thus described the invention, what is claimed as new and desired to secure by Letters Patent is as follows:

1. A sterilizer comprising a housing including spaced side walls, a rear wall, a front wall, a bottom having a drain outlet, a top having a cover closing said opening, a nozzle within said housing through which steam may be discharged within said housing, a plurality of spray pipes within said housing through which water may be discharged within said housing, a receptacle-holder rotatably mounted within said housing, means for retaining a receptacle in said receptacle-holder, means for partially rotating and locking said receptacle-holder in preselected positions to bring the receptacle in the path of discharge steam or water in accordance with a predetermined sterilizing cycle.

2. A sterilizer as specified in claim 1 in which the spray pipes comprise an outer pipe having a plurality of pivoted perforated split segments, an inner perforated pipe extending within said outer pipe, and means connected to said outer pipe adapated to open and close said segments.

3. A sterilizer as specified in claim 1 in which the means for partially rotating and locking said receptacle-holder in preselected positions comprises a grooved arcuate-shaped guide having a plurality of spaced recesses along the bottom of said groove, a plurality of supporting shafts connected to and outwardly extending from said receptacle-holder, one of said shafts extending through a thrust bearing in the side of said housing, a handle attached to the outermost end of such shaft, a lug on said handle, said lug being adapted to slide in the groove of said arcuate-shaped guide, means on said handle for imparting lateral motion to said lug to lockingly engage with the recesses in said groove.

4. A sterilizer as specified in claim 1 in which the means for partially rotating and locking said receptacle-holder in preselected positions comprises a grooved arcuate-shaped guide having a plurality of spaced recesses along the bottom of said groove, a plurality of supporting shafts connected to and outwardly extending from said receptacle-holder, one of said shafts extending through a thrust bearing in the side of said housing, a handle attached to the outermost end of such shaft, a lug on said handle, said lug being adapted to slide in the groove of said arcuate-shaped guide, means on said handle for imparting lateral motion to said lug to lockingly engage with the recesses in said groove; and in which spray pipes comprise an outer pipe having a plurality of pivoted perforated split segments, an inner perforated pipe extending within said outer pipe, and means connected to said outer pipe adapted to open and close said segments.

HARRY CAVI.

REFERENCES CITED

The following references are of record in the file of this patent:

UNITED STATES PATENTS

| Number | Name | Date |
|---|---|---|
| 1,641,097 | Rylander | Aug. 30, 1927 |
| 2,221,351 | Kempf | Nov. 12, 1940 |

FOREIGN PATENTS

| Number | Country | Date |
|---|---|---|
| 383,450 | France | Jan. 8, 1908 |